UNITED STATES PATENT OFFICE 2,609,383

NITROBENZYL THIOPHOSPHATE ESTERS

Willis G. Craig, Willoughby, Ohio, assignor to The Lubrizol Corporation, Wickliffe, Ohio, a corporation of Ohio No Drawing. Application September 30, 1950, Serial No. 187,845

3 Claims. (Cl. 260—461)

The present invention relates to new and useful nitrobenzyl thiophosphate esters and the method of preparation thereof.

As new chemical compounds, the O,O-dialkyl-X-nitrobenzyl thiono- and thionothiol-phosphates wherein the alkyl groups are selected from the class consisting of methyl, ethyl, and propyl and X is either oxygen or sulphur.

The following examples will illustrate methods of preparing representation examples of this invention.

Example 1

To two moles of

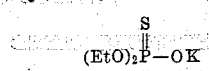

$$(EtO)_2\overset{S}{\underset{\parallel}{P}}-SH$$

were added two moles of KOH dissolved in isopropyl alcohol. 2 moles of p-nitrobenzyl chloride were then added to the resultant solution of the potassium diethyl dithio phosphoric acid and the resultant slurry heated to the reflux temperature of isopropanol (82.5° C.) with constant agitation for 5 hours. The reaction mixture was cooled and the KCl filtered from the liquid reaction mixture. The filter cake was washed with benzene, the benzene wash added to the reaction mixture and the whole dried with magnesium sulfate. The isopropanol and benzene was then stripped from the product under vacuum. A 98.2% yield of a clear reddish moderately viscous oil was obtained which was determined to be O,O-diethyl-S-p-nitrobenzyl thionothiolphosphate.

This product is analyzed as follows:

| | |
|---|---:|
| Percent P: Theory | 9.66 |
| Found | 9.45 |
| Percent S: Theory | 19.9 |
| Found | 20.1 |
| Percent N: Theory | 4.26 |
| Found | 4.21 |

Example 2

1 mole of crystalline $$(EtO)_2\overset{S}{\underset{\parallel}{P}}-OK$$

prepared by the sulfurization of potassium diethyl phosphite was dissolved in isopropanol. One mole of p-nitrobenzyl chloride was added and the resultant slurry heated to the boiling point of the alcohol with constant agitation for 3 hours. The reaction mixture was filtered and the isopropanol evaporated from the filtrate at reduced pressure. A 96% yield of a yellow oil of moderate viscosity was obtained which was determined to be O,O-diethyl-O-p-nitrobenzyl thionophosphate.

| | |
|---|---:|
| Percent P: Theory | 10.3 |
| Found | 10.13 |
| Percent S: Theory | 10.5 |
| Found | 10.52 |
| Percent N: Theory | 4.65 |
| Found | 4.59 |

Example 3

The methyl and isopropyl analogues are prepared in an identical manner starting with the dimethyl or diisopropyl dithiophosphoric acid as in Example 1, and the dimethyl or diisopropyl phosphite as in Example 2, respectively.

The location of the NO₂ group on the benzene ring in the starting material will determine the position of this group in the end product. For certain uses of the end product e. g., as an insecticide, I prefer a predominately para nitrobenzyl compound, however, mixtures of various isomers of the end product may be prepared by using a commercial grade of p-nitrobenzyl chloride which contains a substantial percentage of nitro groups in the meta and ortho positions.

The compounds of this invention possess general pest control characteristics including insecticidal and fungicidal properties. Many of the members possess desirable flotation properties. Many of the members possess desirable flotation properties and have the characteristics of high pressure lubricants when used as oil additives. These compounds may also be employed as corrosion inhibitors.

The thiophosphate esters of this invention may be employed in controlling many types of insects and mites. In order to properly utilize this invention as an insecticide, it is necessary to prepare such insecticidal compositions by admixing the nitrobenzyl thiophosphate esters of this invention with suitable adjuvants to provide compositions in the form of solutions, dusts, water dispersible powders and aqueous dispersions or emulsions.

By the terms "insecticidal adjuvant" I mean a substance which is capable of aiding in the presentation of an insect toxicant to an insect. The term "adjuvant" is well established in the art where it is well recognized that an adjuvant or toxicant is of itself of little practical utility for combating insects unless it would be presented in a form suitable for effect in contact of the adjuvant or its vapors as the particular case may require, with the insect, thus additional material or materials are employed in the formulation of an active adjuvant to yield a suitable insecticidal composition, such materials being adjuvants.

Compounds of this invention are substantially insoluble in water and are only slightly soluble in paraffinic hydrocarbons. They are soluble in aromatic hydrocarbons and in most of the usual oxygenated solvents.

They may be formulated as dusts by impregnation of an inert carrier with solutions of the toxicants in a volatile solvent (such as acetone) followed by evaporation of the solvent, or they may be mixed with the desired carrier directly and the mixture thoroughly triturated. The former method appears to give a more satisfactory insecticidal dust which may be applied for the control of insect pests by means of the usual dusting techniques.

A more satisfactory method of applying these compounds for the control of pests is as emulsions of solvent solutions of the toxicant in water. Formulations of this type may be made by making solutions of from one to 50% concentration of the toxicant in a suitable water-insoluble organic solvent and then emulsifying from 0.1% to 10% of such solution in water by means of an emulsifying agent such as blood albumin, alkyl-aryl sulfonates, sodium alkyl sulfates, poly esters, etc. Desired characteristics of the solvent for such use are that they be of fairly high molecular weight, non-phytotoxic and relatively inexpensive. Kerosene or a highly refined light mineral oil is usually an excellent choice for such a solvent, but in the case of the compounds of this invention, the use of these paraffinic solvents limits the concentration of toxicant that can be applied in a small amount of solvent. Consequently, the aromatic solvents are preferred. Outstanding among such aromatic solvents for the compounds of this invention are the alkylated diphenyl oxides (see copending application Serial No. 51,650 filed September 28, 1948) which combine high molecular weight, low volatility and excellent solubility with a very low phytotoxicity unusual in aromatic compounds and, in addition, are excellent insecticides for certain pests in their own right.

The compounds of my invention have been found exceptionally effective in combating flies. The following results clearly indicate the effectiveness of my composition as an insecticide.

1. Topical application to adult female flies. Single measured drops of 0.001 ml. of acetone solutions of the toxicants were applied to the thorax of two-day old female flies. 25 flies were used per concentration and the percent mortality determined after 24 hours. The results were as follows:

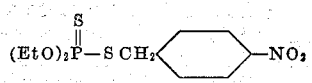

| Percent Concentration | Percent Mortality |
|---|---|
| 0.25 | 100 |
| 0.10 | 100 |
| 0.05 | 80 |
| 0.025 | 65 |
| 0.010 | 20 |

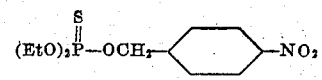

| Percent Concentration | Percent Mortality |
|---|---|
| 0.25 | 100 |
| 0.10 | 80 |
| 0.05 | 50 |
| 0.025 | 15 |

2. In another test of the same nature it was found that the toxicants were very lethal to flies, but quite harmless to worker bees when applied topically. The comparison is as follows:

*Topical $LD_5°$*

(Median lethal dosage expressed in micrograms per gram of body weight)

| Compound | to Worker bees | to House flies |
|---|---|---|
| $(EtO)_2\overset{S}{\overset{\|}{P}}-OCH_2-\langle\rangle-NO_2$ | 1,000 | 26 |
| $(EtO)_2\overset{S}{\overset{\|}{P}}-SCH_2-\langle\rangle-NO_2$ | 1,000 | 21 |

3. For the control of the 2-spotted mite, compositions of this invention were formulated as an emulsion in water and varying concentrations were sprayed on small plants infested with the mites. The results of this test indicate the remarkable effectiveness of this compound for the control of mites.

| Compound | Percent Dosage | Mortality—Adult, 2-spotted mites |
|---|---|---|
| $(EtO)_2\overset{S}{\overset{\|}{P}}-SCH_2-\langle\rangle-NO_2$ | 0.2 | 100 |
| | 0.1 | 100 |
| | 0.05 | 100 |
| | 0.025 | 100 |
| | 0.0125 | 100 |
| | 0.006 | 100 |
| | 0.003 | 93.4 |

Therefore, I claim:

1. As new chemical compounds, the O,O-dialkyl-X-nitrobenzyl thiono- and thionothiolphosphates wherein the alkyl groups are selected from the class consisting of methyl, ethyl, and propyl and X is either oxygen or sulphur.

2. As new chemical compounds, the O,O-dialkyl-O-nitrobenzyl thiono phosphates wherein the alkyl groups are selected from the class consisting of methyl, ethyl, and propyl.

3. As new chemical compounds, the O,O-dialkyl-S-nitrobenzyl thionothiol phosphates wherein the alkyl groups are selected from the class consisting of methyl, ethyl, and propyl.

WILLIS G. CRAIG.

REFERENCES CITED

The following references are of record in the file of this patent:

UNITED STATES PATENTS

| Number | Name | Date |
|---|---|---|
| 2,506,344 | Cleary | May 2, 1950 |